US011886130B2

(12) United States Patent

Cohen et al.

(10) Patent No.: US 11,886,130 B2
(45) Date of Patent: Jan. 30, 2024

(54) PRINT AGENT APPLICATOR POSITIONING DEVICES

(71) Applicant: Hewlett-Packard Development Company, L.P., Spring, TX (US)

(72) Inventors: Lavi Cohen, Nes Ziona (IL); Elad Alfo, Nes Ziona (IL); Shimi Nakash, Nes Ziona (IL); Yonni Hartstein, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/777,437

(22) PCT Filed: Dec. 20, 2019

(86) PCT No.: PCT/US2019/067800
§ 371 (c)(1),
(2) Date: May 17, 2022

(87) PCT Pub. No.: WO2021/126236
PCT Pub. Date: Jun. 24, 2021

(65) Prior Publication Data

US 2022/0397843 A1 Dec. 15, 2022

(51) Int. Cl.
*G03G 15/10* (2006.01)

(52) U.S. Cl.
CPC .................................. *G03G 15/104* (2013.01)

(58) Field of Classification Search
CPC ..................................... G03G 2215/0174–018
See application file for complete search history.

(56) References Cited

U.S. PATENT DOCUMENTS 3,942,474 A 3/1976 Smith et al.
4,896,193 A 1/1990 Kagiura et al.
5,239,347 A * 8/1993 Onodera ............ G03G 15/1655 399/304
6,234,603 B1 5/2001 Altfather et al.
6,282,392 B1 * 8/2001 Yamaguchi .......... G03G 15/161 399/237
6,711,372 B1 3/2004 Noda et al.
7,177,575 B2 * 2/2007 Okabe ................ G03G 15/0121 399/119
8,463,148 B2 6/2013 Yamamoto et al.
8,818,235 B2 * 8/2014 Kishi ................. G03G 21/1821 399/113
11,287,761 B2 * 3/2022 Itabashi ............. G03G 15/0808
2013/0071141 A1 3/2013 Ueno et al.
(Continued)

FOREIGN PATENT DOCUMENTS

JP 10333435 A * 12/1998
JP 2009047845 A * 3/2009 ......... G03G 15/0813
(Continued)

*Primary Examiner* — Leon W Rhodes, Jr.

(57) ABSTRACT

A positioning device to control the position of a print agent applicator comprises a mount to support a print agent applicator at a load point on the mount; an actuator coupled to the mount to apply a driving force at an actuation point on the mount; and a guide mechanism to guide the mount and supported print agent applicator, under the driving force, to translate along a predetermined path towards a printing drum to form an engaging contact between the print agent applicator and the printing drum.

13 Claims, 17 Drawing Sheets

(56) References Cited

U.S. PATENT DOCUMENTS

| | | | | |
|---|---|---|---|---|
| 2020/0310340 | A1* | 10/2020 | Itabashi | G03G 15/0813 |
| 2021/0080862 | A1* | 3/2021 | Kusano | G03G 15/0856 |
| 2021/0165341 | A1* | 6/2021 | Tsukahara | G03G 15/0189 |

FOREIGN PATENT DOCUMENTS

| | | | |
|---|---|---|---|
| JP | 4630656 | B2 | 2/2011 |
| JP | 2014-112169 | A | 6/2014 |
| WO | 2016/143333 | A1 | 9/2016 |

* cited by examiner

PRINT AGENT APPLICATOR POSITIONING DEVICES

BACKGROUND

In printing, print agent is applied to a substrate.

BRIEF DESCRIPTION OF DRAWINGS

Non-limiting examples will now be described with reference to the accompanying drawings, in which.

DETAILED DESCRIPTION

Figure 1:
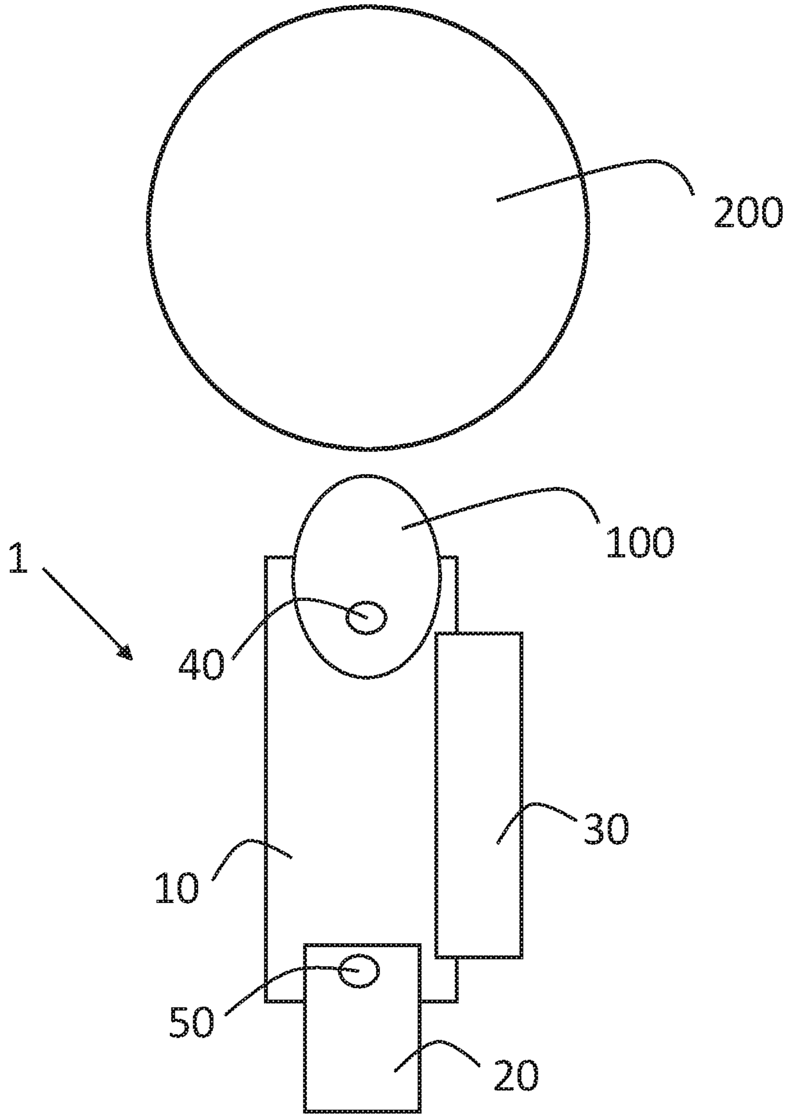
FIG. 1 is a simplified schematic side view of an example print agent applicator positioning device to position a print agent applicator with respect to a printing drum.

During a printing operation, print agent may be transferred from a print agent applicator to a printing drum to form a latent print agent image on the drum exterior surface. The print agent may comprise an ink, toner, coating and the like. An intermediate member may then transfer the latent print agent image from the printing drum to a substrate to create a printed image. The substrate may in principle comprise any material, including paper, card, plastics, or fabric.

For example, a printing apparatus may comprise a liquid electrophotographic (LEP) printing apparatus where the print agent applicator may supply an electrostatic print agent. For example, the print agent applicator may be a binary ink developer (BID) to supply an electrostatic ink. The printing drum may comprise a photoconductive plate. For example, the photoconductive plate may be a photo imaging plate (PIP). A photoconductor charging unit may deposit a substantially uniform static charge on the exterior surface of the photoconductive plate. The exterior surface is then exposed to light by an image writing unit to selectively dissipate the static charge and form a latent electrostatic image. The electrostatic print agent is attracted or repelled, depending on the potential at the photoconductive plate, to the latent electrostatic image and a latent printing fluid image is formed on the exterior surface of the photoconductive plate.

In a printing apparatus, the print agent applicator may transfer print agent to the printing drum from a print agent source. The print agent applicator may include a print agent roller to present a uniform layer of print agent to the printing drum. To apply the print agent to the printing drum, the print agent applicator is arranged in engaging contact with the printing drum, whereby the print agent roller exterior surface forms an engaging (mating) contact with printing drum exterior surface. The engaging contact between the print agent applicator and the printing drum may be referred to as "nip contact". The engaging force applied by the print agent applicator in nip contact with the printing drum may be referred to as the "nip force".

At certain points, the print agent applicator may be disengaged from the printing drum to inhibit the application of the print agent. This may, for example, be to avoid print agent transfer to "non-printing" regions of the printing drum (i.e. those regions in which a latent image is not formed), and/or to avoid a "seam" region of the printing drum. In some examples, a printing apparatus may have a number of print agent applicators, each associated with a different print agent such as a different colour, coating agent or the like. A first print agent applicator may be disengaged from the printing drum to allow for a second print agent applicator to engage the printing drum.

In some examples, a print agent applicator may be caused to engage and/or disengage the printing drum under the control of a positioning device. A printing apparatus may comprise two, or more than two, spaced positioning devices, which may act on the print agent applicator to position it in relation to the printing drum.

FIG. 1 depicts an example of a positioning device 1 to position a print agent applicator 100 relative to a printing drum 200. The positioning device 1 comprises a mount 10 to support the print agent applicator 100, an actuator 20 to apply a driving force to the mount 10, and a guide mechanism 30 to guide the mount 10, and thereby the supported print agent applicator 100, to translate along a predetermined path in relation to the printing drum 200. The print agent applicator 100 is supported at a load point 40 on the mount 10. The driving force is applied to an actuation point 50 on the mount 10. The expression "translate" is used herein to denote translational movement without rotation.

Figure 2:
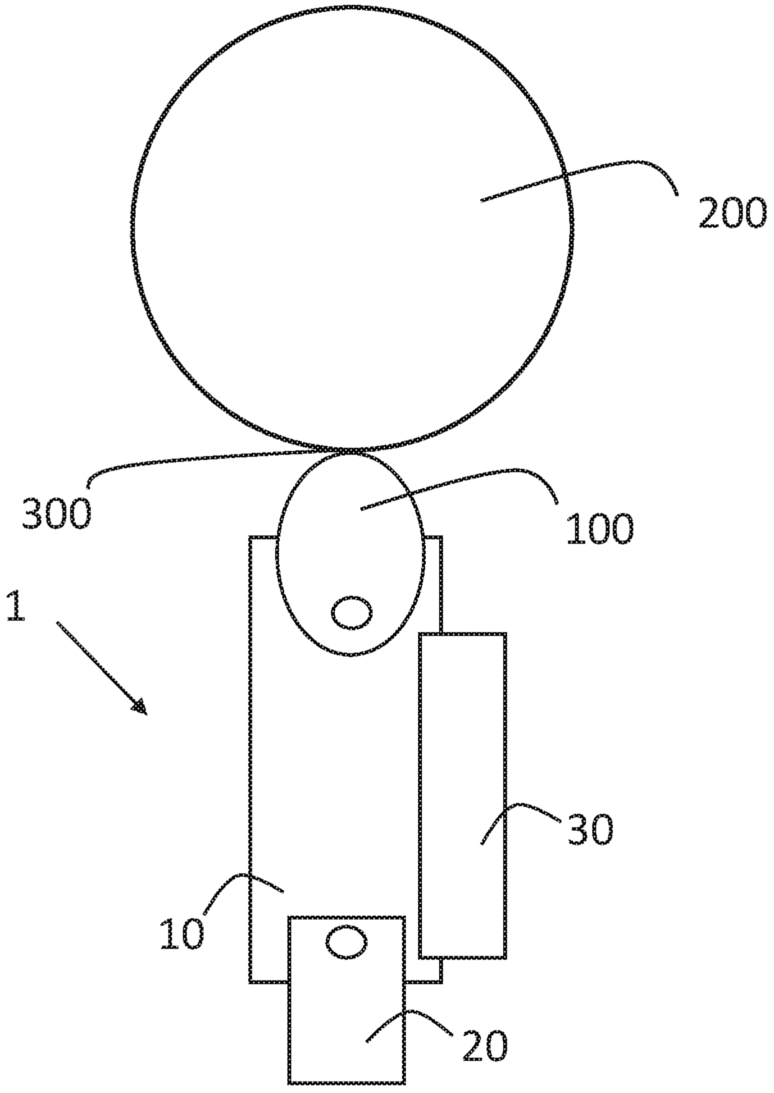
FIG. 2 is a simplified schematic side view of the print agent applicator positioning device of FIG. 1 positioning the print agent applicator in an engaging contact with the printing drum.

When the actuator 20 is activated to apply the driving force, and the mount 10 and the supported print agent applicator 100 are subject to the driving force, the guide mechanism 30 guides the mount 10 and the supported print agent applicator 100 to move with translational motion along the predetermined path towards the printing drum 200 to an engaging position on the predetermined path whereby the print agent applicator 100 forms an engaging contact 300 with the printing drum 200, as shown by example in FIG. 2.

The predetermined path of the guide mechanism may be a linear path, curved path or any other suitable shaped path. As the mount and supported print agent applicator translate along the predetermined path, there is no change in the orientation of the mount and supported print agent applicator relative to a stationary printing drum, or relative to a support to which the mount may be supported. In other words, the mount and supported print agent applicator do not rotate or pivot relative to the printing drum or support during translation, and so the orientation of the mount and the supported print agent applicator remains constant.

By moving the print agent applicator translationally along the predetermined path and maintaining the orientation (i.e. inhibiting rotation) of the print agent applicator during translation, the guide mechanism provides for an accurate radial mating contact between the print agent applicator and printing drum, whereby the print agent applicator forms an engaging contact with the printing drum in a radial direction to the printing drum. By forming an accurate radial mating contact, the transfer of print agent from the print agent applicator to the printing drum is thereby improved, for example, the risk of smearing of the print agent is reduced. Hence, the printing quality is enhanced.

Figure 3A:
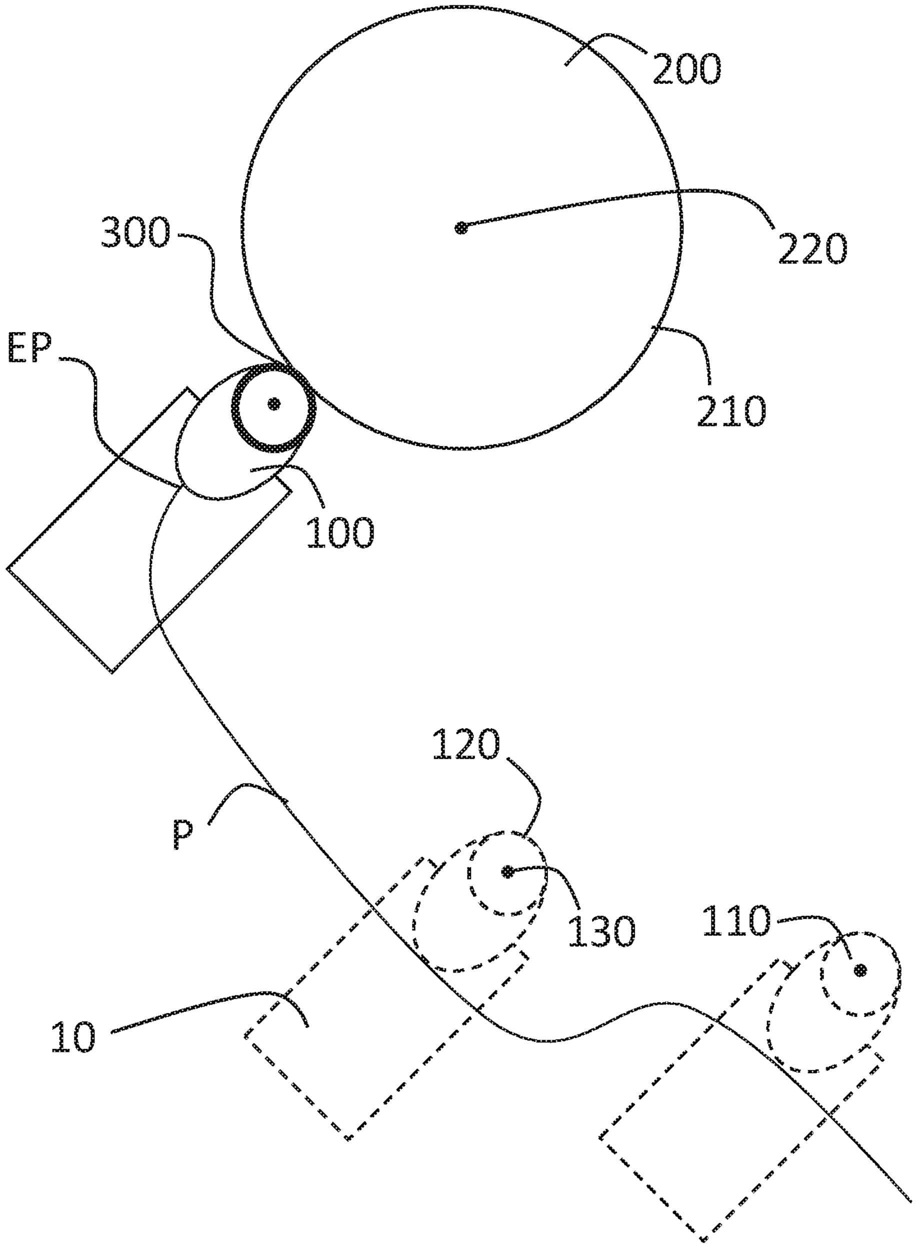
FIGS. 3*a* and 3*b* are simplified schematic side views of an example print agent applicator positioning device translating a print agent applicator along a predetermined path and positioning the print agent applicator in an engaging contact with a printing drum.
Figure 3B:
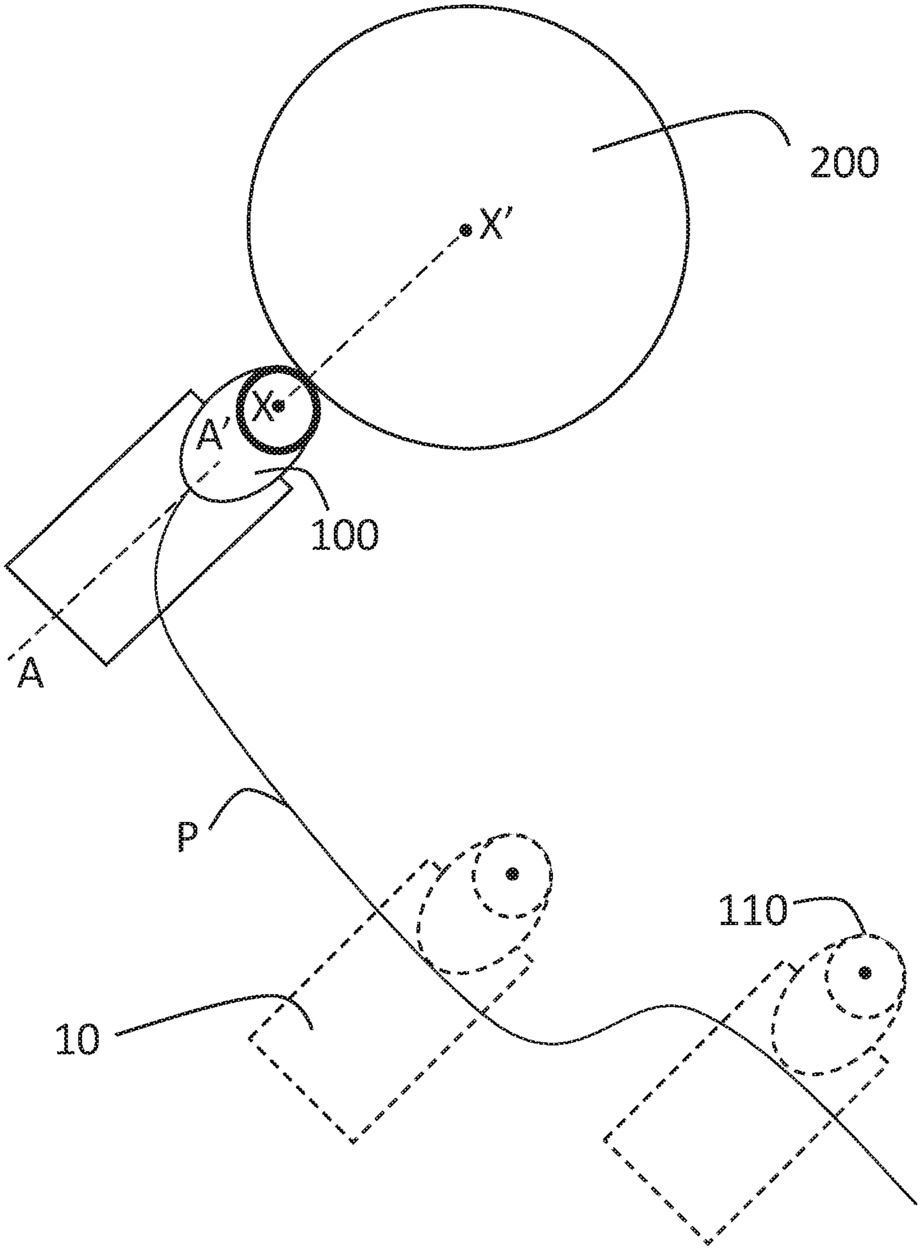

FIGS. 3*a* and 3*b* show an example of a positioning device similar to that described in relation to FIGS. 1 and 2 in that it comprises a mount 10 to support the print agent applicator 100, an actuator (not shown) to apply a driving force on the mount 10 at an actuation point (not shown) and a guide mechanism (not shown) to guide the mount 10, and the supported print agent applicator 100, to translate along a predetermined path P. In this example, the print agent applicator 100 comprises a print agent roller 110 to apply print agent on the printing drum 200. FIGS. 3*a* and 3*b* show how, under the driving force, the guide mechanism (not shown) guides the mount 10, and the supported print agent applicator 100, to move with a translational movement along a predetermined path P towards the printing drum 200 to an engaging position EP on the predetermined path where the print agent applicator 100 is arranged in engaging contact 300 with the printing drum 200. The orientation of the print agent applicator 100 remains constant as it translates along the predetermined path P. The direction of the predetermined path P represents the direction of translational motion of the mount 10 and the supported print agent applicator 100. At the engaging position EP, the predetermined path is directed in a radial direction towards the printing drum 200 along an axis AA'. Hence, the print agent applicator 100 is translated in a radial direction at the engaging position EP on the predetermined path to form a radial engaging contact with the printing drum. The exterior surface 120 of the print agent roller forms a radial mating contact with the exterior surface 210 of the printing drum, whereby the radial axis XX' extending between the center 130 of the print agent roller and center 220 of the printing drum is aligned with the engaging position axis AA'.

Figure 4:
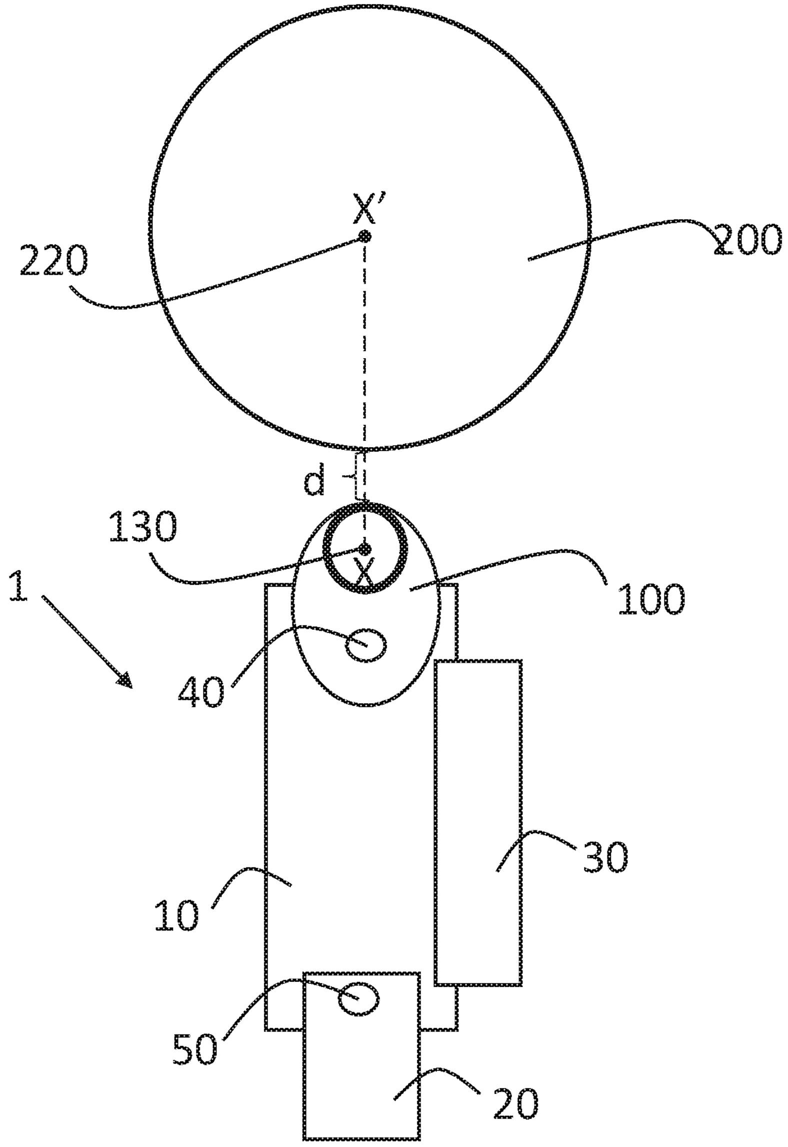
FIG. 4 is a simplified schematic side view of an example print agent applicator positioning device positioning a print agent applicator in disengagement with a printing drum.

In an example of a positioning device 1 shown in FIG. 4, and similar to that shown in FIGS. 1 and 2, the guide mechanism 30 may guide the mount 10, and the supported print agent applicator 100 to translate along the predetermined path away from the printing drum to a disengaging position on the predetermined path relative to the printing drum 200. At the disengaging position, the supported print agent applicator 100 is disengaged from the printing drum and separated from the printing drum by a predetermined distance d. As shown in FIG. 4, the predetermined distance may be a predetermined radial distance with an axis aligned with the radial axis XX' extending between the centers 130, 220 of the print agent roller and the printing drum.

In an example, the guide mechanism 30 may guide the mount 10 and the supported print agent applicator 100 to move along the predetermined path away from the printing drum 200 to a disengaging position on the predetermined path with respect to the printing drum 200 when the actuator 20 is deactivated and the mount 10 and supported print applicator 100 are subject to a gravitational force.

The positioning device may have an engagement mode to engage the print agent applicator and printing drum when the actuator is activated to apply a driving force, and a default disengagement mode to disengage the print agent applicator and printing drum when the actuator is deactivated. The positioning device may be biased, for example by the gravitational force, to disengage the print agent applicator from the printing drum so that the disengagement mode is a default mode of the positioning device. Due to the default nature of the disengagement mode, the positioning device improves operating safety by allowing the print agent applicator to disengage from the printing drum during a power supply failure or shut down. The positioning device has a simple and low-cost design, avoiding the need for a costly and complex back-up power supply.

In an example, the actuator 20 may be activated to apply a returning force to the mount 10 at the actuation point 50, whereby the returning force is in an opposite direction to the driving force. When the actuator 20 is activated to apply the returning force, the guide mechanism 30 may guide the mount 10 and supported print agent applicator 100 along the predetermined path away from the printing drum 200 to the disengaging position on the predetermined path.

Unlike other modes of movement (for example, pivoting movement of a print agent applicator about a pivot), translational movement may be effected by the guide mechanism so that a mechanical advantage of the mount (i.e. the ratio of the output force applied to the print agent applicator by the mount, to the input driving force applied to the mount by the actuator) may remain constant during the movement of the mount and print agent applicator along the predetermined path.

By utilizing a guide mechanism to permit translational movement and prevent non-translational movement, the mechanical advantage by which the driving force is transferred from the actuation point 50 to the load point 40 may be independent of the distance between the actuation point 50 and the load point 40, that is to say, independent of the relative positioning of the actuation point 50 and the load point 40 on the mount. While it will be appreciated that any particular positioning device as installed may have a specific actuation point 50 and load point 40 which are non-variable during operation, it may nevertheless be of use to provide for modification of the relative positioning of the actuation point

50 and the load point 40. For example, this may be useful if a type or position of an actuator, a mount or an applicator is to be varied. Further, this may be useful in providing for the efficient mechanical design of a series of positioning devices that may have different installation and load point or actuation point constraints, since the mechanical advantage can be relied upon to be the same from one positioning device to the other, irrespective of variations in the particular geometry.

The driving force transferred from the actuation point 50 to the load point 40 may be parallel and opposite to the load force of the print agent applicator at the load point 40. Hence, the relationship between the driving and load forces remains constant, and independent of the distance between the actuation point 50 and load point 40. The positioning device thereby avoids the need for a complex actuator to amplify the driving force. When the driving force and load force are parallel, opposite and on a common axis, the sum of the moments may be zero and no turning moment is exerted on the mount and the supported print agent applicator by the driving force and the load force. As a result, the guide mechanism is not required to compensate for any turning moments due to the driving and load forces and so the guiding effect of the guide mechanism remains constant and the control and positioning by the positioning device is improved.

In an example, the guide mechanism may comprise a linkage mechanism. The linkage mechanism may comprise two parallel links coupled to the mount and a support. Such a linkage mechanism may therefore serve as a parallelogram linkage (a particular implementation of a four-bar linkage). Within the established terminology of four-bar linkages, the support to which the parallel links are coupled may be considered a ground link, the parallel links may be considered as rockers (or cranks, when permitted to rotate through 360°), and the mount may be considered a floating link. In a parallelogram linkage with crank members of equal length, the angular orientation of the floating link relative to the ground link is constant. The pivoting action of the parallel links (cranks) defines the predetermined path along which the mount, and thereby the supported print agent applicator, travel with translational motion.

Figure 5:
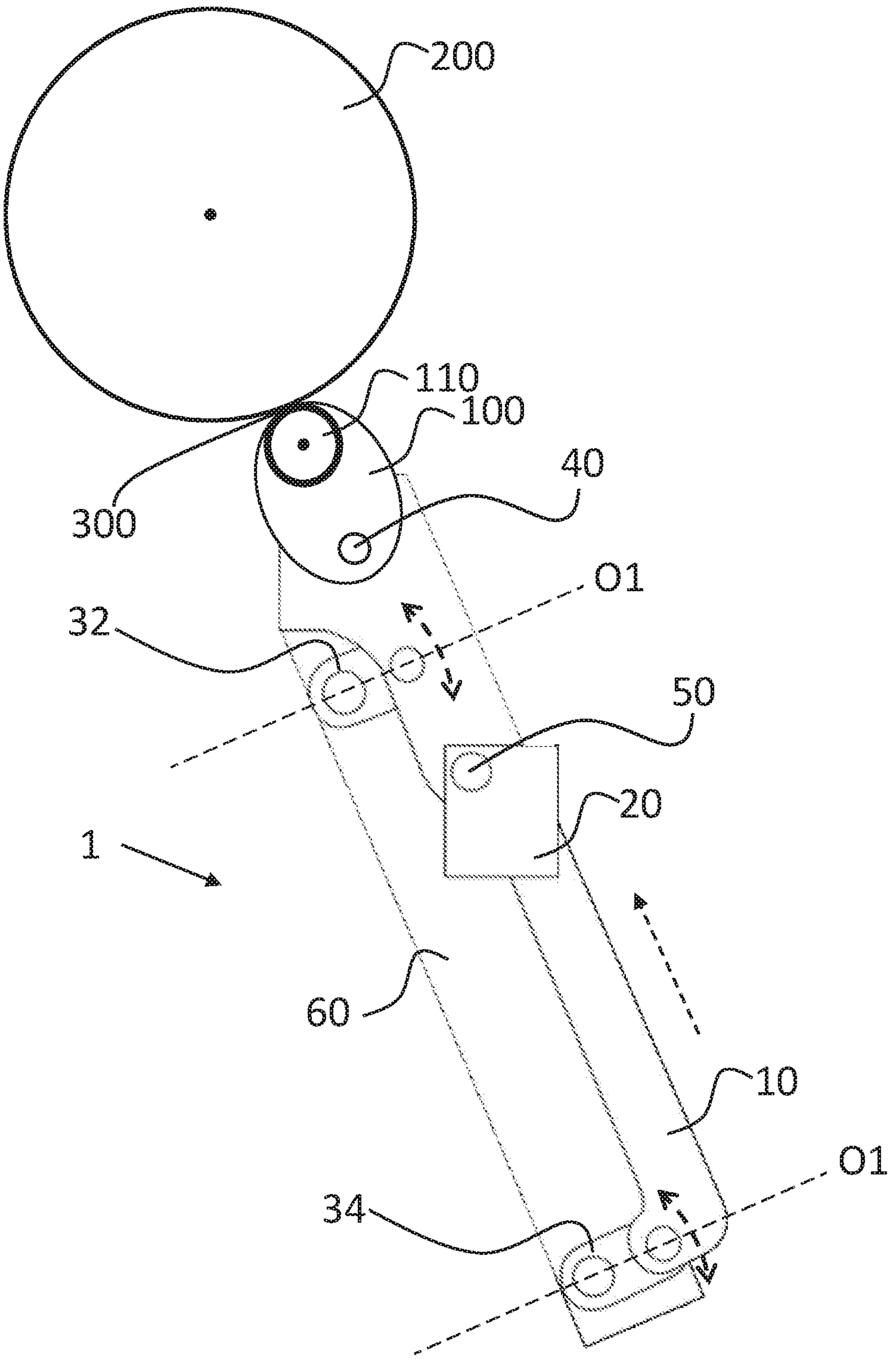
FIG. 5 is a simplified schematic side view of an example print agent applicator positioning device, with a parallel linkage guide mechanism, positioning a print agent applicator in an engaging contact with a printing drum.
Figure 6:
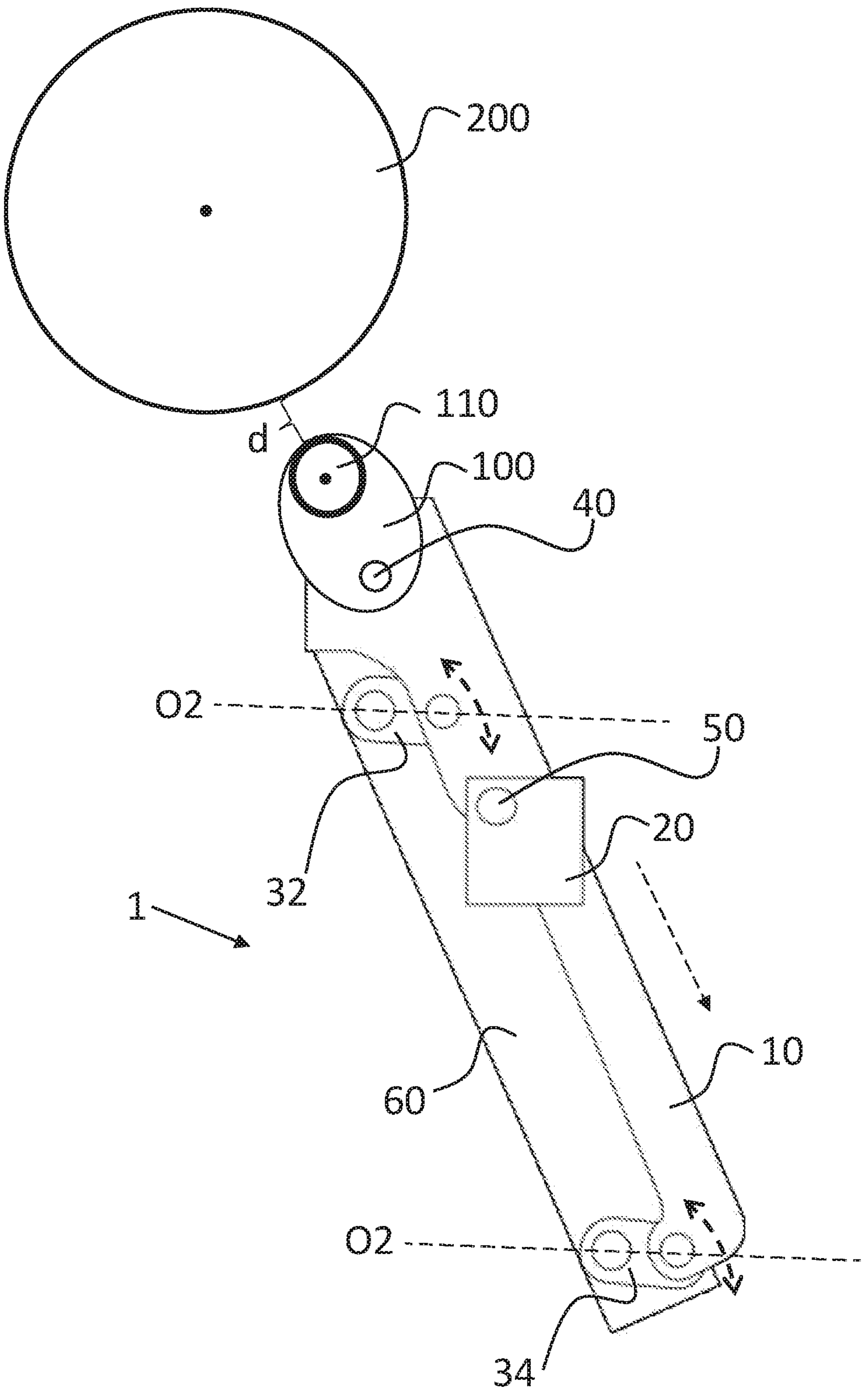
FIG. 6 is a simplified schematic side view of the print agent applicator positioning device, with the parallel linkage guide mechanism of FIG. 5, positioning the print agent applicator in disengagement with the printing drum.

FIGS. 5 and 6 relate to an example of a positioning device 1 to position a print agent applicator 100 relative to a printing drum 200 with a parallel linkage guide mechanism. The positioning device comprises an elongate mount 10 to support a print agent applicator 100 at a load point 40 on the mount. In this example, the print agent applicator comprises a print agent roller 110 to supply a film of print agent to the printing drum 200. An actuator 20 applies a driving force on the mount at an actuation point 50 on the mount 10. The parallel linkage guide mechanism comprises a first link 32 and a second link 34. The links 32, 34 are equal in length, arranged in parallel and rotatably coupled to the mount 10 and to a support 60. The parallel links 32, 34 are rotatable with respect to the support 60 to permit the mount 10 and the supported print agent applicator 100 to move along a predefined path relative to the printing drum 200, while maintaining a constant angular orientation relative to the printing drum 200. Due to the rotation of the parallel links 32, 34 the predefined path is a curved path. The parallel links 32, 34 may rotate to between a first orientation O1 and a second orientation O2 relative to the support 60. At the first orientation O1, the mount 10 and the supported print agent applicator 100 are positioned at an engaging position on the predetermined path whereby the supported print agent applicator 100 is in engaging contact 300 with the printing drum 200, as shown in FIG. 5. At the second orientation O2, the mount 10 and the print agent applicator 100 are positioned at a disengaging position on the predetermined path whereby the print agent applicator 100 is disengaged from the printing drum 200 and spaced apart from the printing drum 200 by a predetermined distance d, as shown in FIG. 6.

When the actuator 20 is activated to apply the driving force on the mount 10, the driving force acting on the mount 10, and the supported print agent applicator 100, causes the parallel links 32, 34 to rotate to the first orientation O1. The rotating parallel links 32, 34 move the mount 10 and the supported print agent applicator 100 to translate along the predetermined path towards the printing drum 200 to the engaging position on the predetermined path whereby the supported print agent applicator 100 forms an engaging contact 300 with the printing drum 200.

When the actuator 20 is deactivated and a gravitational force acts on the mount 10 and the supported print agent applicator 100, or when the actuator 20 is activated to apply a returning force on the mount at the actuation point 50, the gravitational force or returning force acting on the mount 10, and the supported print agent applicator 100, causes the parallel links 32, 34 to rotate to the second orientation O2. The rotating parallel links 32, 34 move the mount 10, and the supported print agent applicator 100, with a translational motion along the predetermined path away from the printing drum 200 to a disengaging position on the predetermined path, whereby the supported print agent applicator 100 is disengaged from the printing drum and separated from the printing drum by a predetermined distance d.

Figure 7:
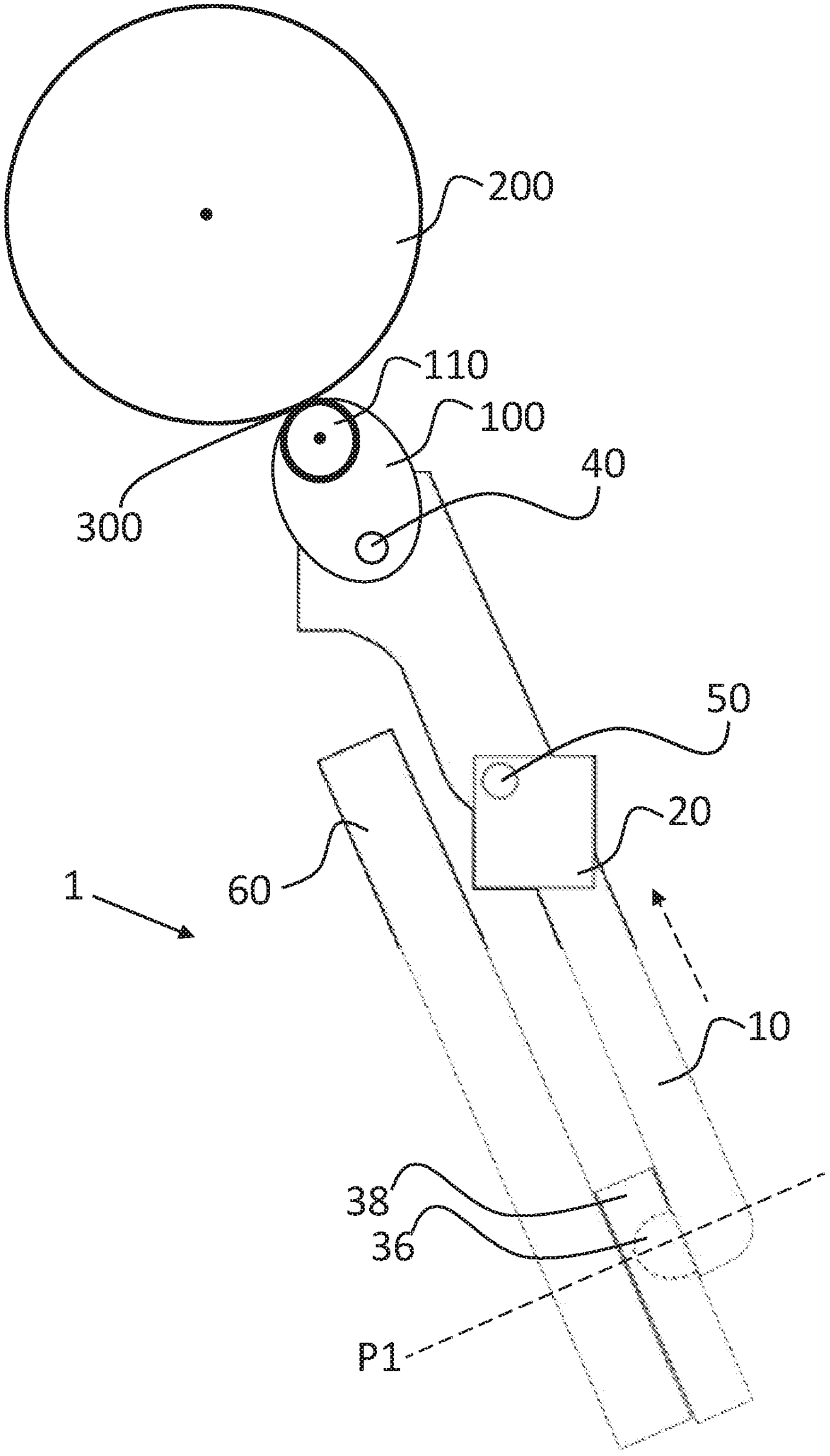
FIG. 7 is a simplified schematic side view of an example print agent applicator positioning device, with a linear actuator guide mechanism, positioning a print agent applicator in an engaging contact with a printing drum.
Figure 8:
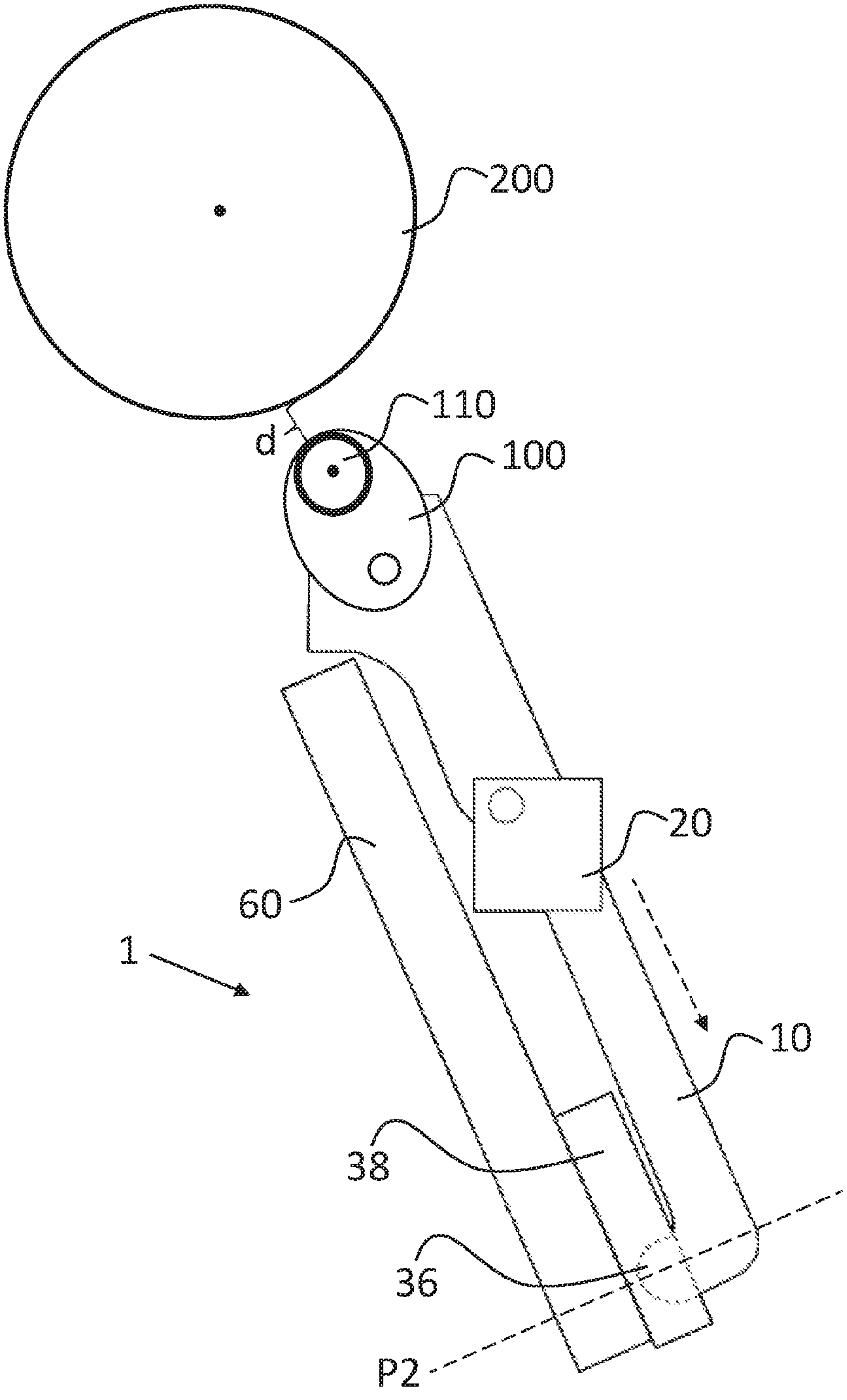
FIG. 8 is a simplified schematic side view of the print agent applicator positioning device, with the linear actuator guide mechanism of FIG. 7, positioning the print guide applicator in disengagement with the printing drum.

In other examples, a guide mechanism may comprise a linear actuator acting between the mount 10 and a support 60. The linear action of the actuator defines the predetermined path along which the mount 10, and the supported print agent applicator 100, can move with translational motion. By way of example, FIGS. 7 and 8 depicts a positioning device 1 similar to that described above with respect to FIGS. 5 and 6 in that it comprises an elongate mount 10 to support a print agent applicator 100 at a load point 40 on the mount, and an actuator 20 to apply a driving force on the mount 10 at an actuation point 50. In this example, the positioning device comprises a guide mechanism having a rider 36 and an elongate track 38. The track 38 is coupled to a support 60 and, in this example, extends in an elongate direction which is parallel with an elongate direction of the mount 10. The track 38 defines a predefined linear path. The rider 36 extends from the mount 10 and is slidably coupled to the track to slide along the track 38. As the rider 36 is caused to slide along the track 38, the rider 36 translates the mount 10 along the predefined linear path while maintaining a constant angular orientation relative to the support 60. As shown in FIGS. 7 and 8 the rider 36 may have a first position P1 and a second position P2 on the track 38 and slide therebetween. When the rider 36 is arranged in the first position P1 on the track, the print agent applicator 100 supported by the mount 10 is in engaging contact 300 with a printing drum 200. When the rider 36 is arranged in the second position P2 on the track, the print agent applicator 100 is disengaged from the printing drum 200 and arranged in a spaced relationship from the printing drum by a predetermined distance d.

When the actuator 20 is actuated, a driving force acts on the rider 36 to cause the rider 36 to slide along the track 38 to the first position P1. The mount 10, and supported print agent applicator 100, move in unison with the rider 36 so as to translate upwardly along the predefined path towards the printing drum 200 to an engaging position on the path whereby the supported print agent applicator 100 forms an engaging contact 300 with the printing drum 200.

When the actuator 20 is deactivated and a gravitational force acts on the mount 10 and the supported print agent applicator 100, or when the actuator 20 is activated to apply a returning force on the mount at the actuation point 50, the gravitational force or returning force acting on the mount 10, and the supported print agent applicator 100, causes the rider 36 to slide back along the track 38 to the second position P2. The mount 10 and supported print agent applicator 100 translate in unison with the rider 36 downwardly along the predefined path away from the printing drum (not shown). The print agent applicator 100 disengages from the printing drum and is arranged in spaced relationship from the printing drum by a predetermined distance d.

Figure 9:
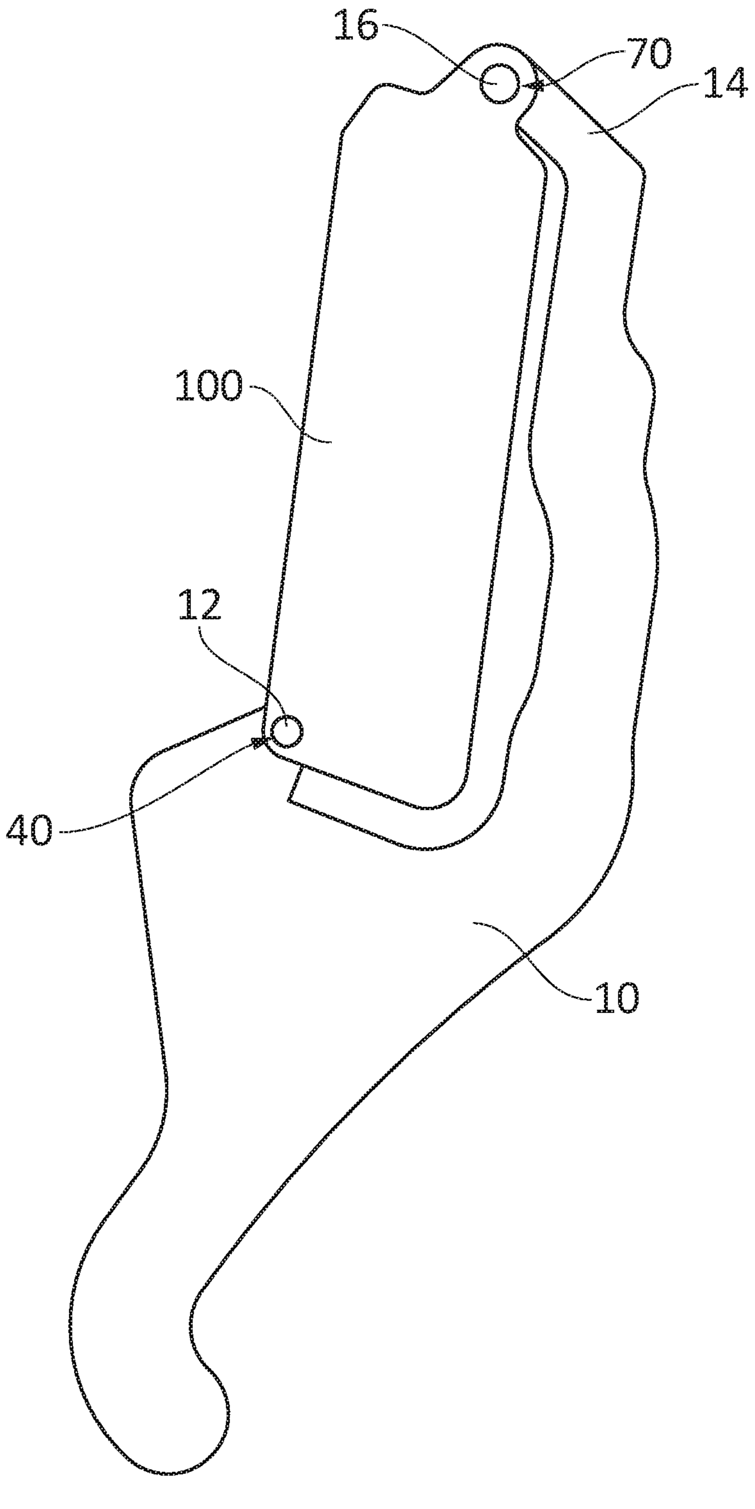
FIG. 9 is a simplified schematic side view of an example mount for a print agent applicator positioning device.

The mount of a positioning device may comprise a supporting connector to hold the print agent applicator at the load point on the mount. The connector may comprise any suitable releasable connecting mechanism. The connector may comprise a recess in which the print agent applicator may be releasably received. In an example of a mount 10 shown in FIG. 9, the mount 10 comprises a releasable coupling 12 to engage a lower region of the print agent applicator 100 at the load point 40 of the mount.

The mount may comprise a stabilising connector to hold the print agent applicator at a stabilising point on the mount, in addition to and separate from the connection at the load point. The stabilising connector may comprise a recess in which the print agent applicator can be releasably received and/or comprise a releasable coupling. The stabilising connector may be adjustable to prevent mechanical overconstrain of the print agent applicator. The stabilising connector inhibits relative rotational movement between the supported print agent applicator and the mount about the load point, and thereby improves the stability of the print agent applicator relative to the mount. As a result, a more accurate mating contact between the print agent applicator and printing drum can be achieved. In an example shown in FIG. 9, the mount 10 comprises a stabilising arm 14 extending adjacent the print agent applicator 100 and a stabilising connector 16 arranged at a distal end of the stabilising arm (i.e. distal relative to a proximal end of the stabilising arm where it is attached to a main part of the mount including the load point 40 and any actuation point) to engage an upper region of a print agent applicator 100 at the stabilising point 70 of the mount. By inhibiting rotational movement of the print agent applicator 100 relative to the mount 10, relative tangential movement between the print agent applicator 100 and the printing drum is also inhibited. As a result, the accuracy of the radial mating contact between the print agent applicator 100 and printing drum 200 is improved. In an example, the print agent applicator 100 may be held by supporting connectors at the front and rear regions of the print agent applicator and a stabilising connector at a front region of the print agent applicator to achieve mechanical positioning of the print agent applicator 100 in the mount 10.

Figure 10:
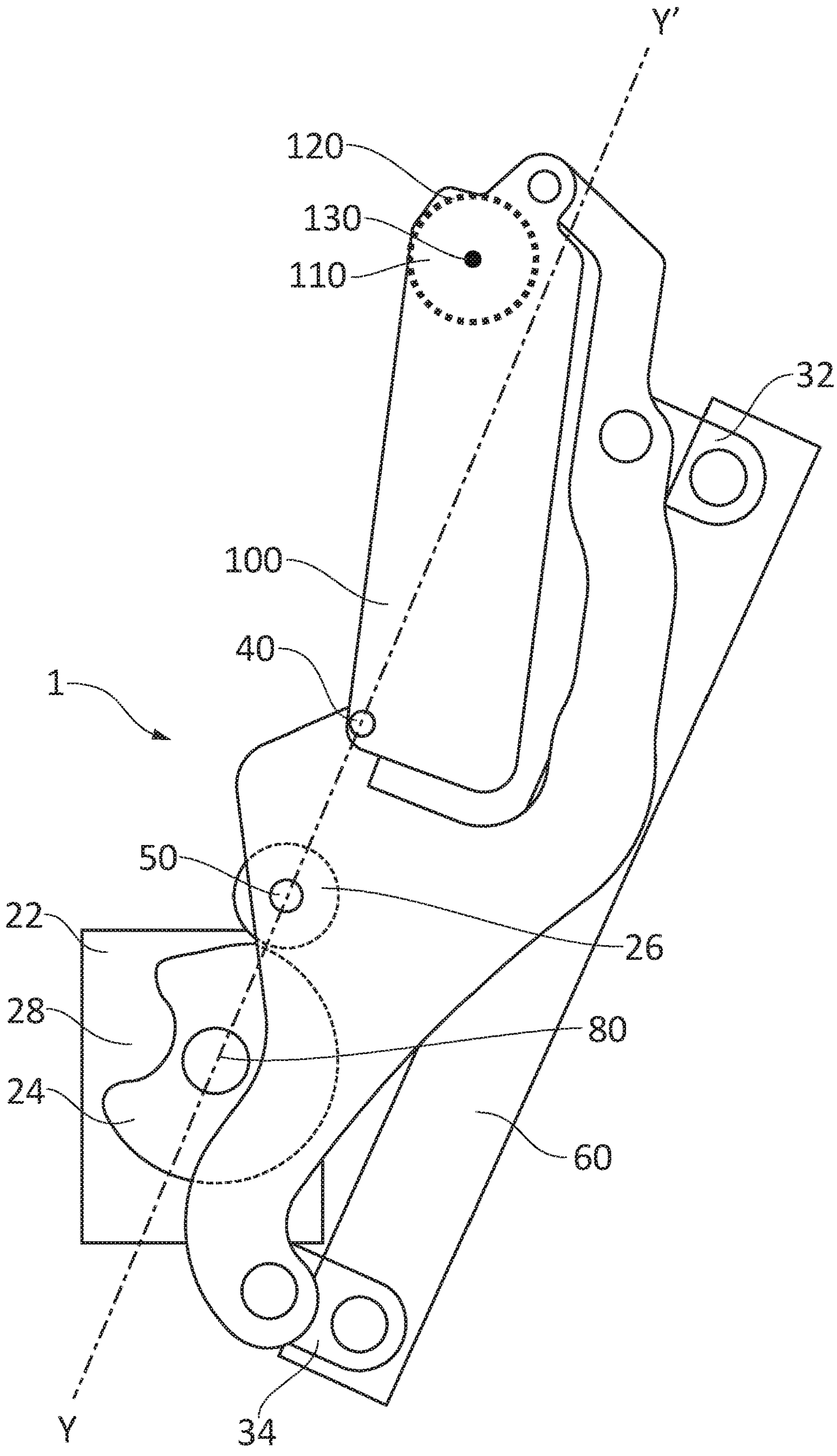
FIG. 10 is a simplified schematic side view of an example print agent applicator positioning device with a drive motor, cam and follower type actuator.
Figure 11:
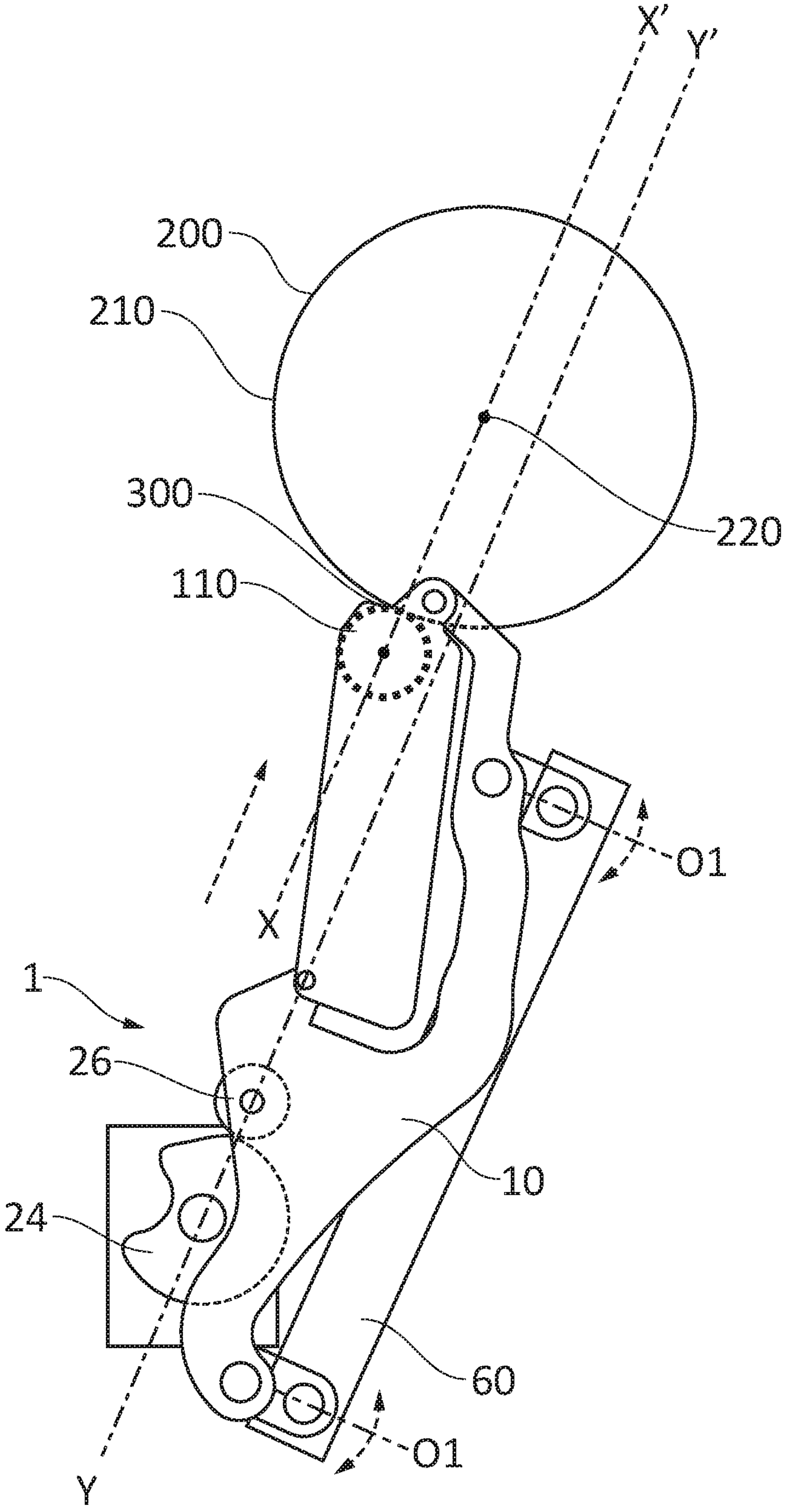
FIG. 11 is a simplified schematic side view of the print agent applicator positioning device of FIG. 10 positioning the print agent applicator in an engaging contact with a printing drum.
Figure 12:
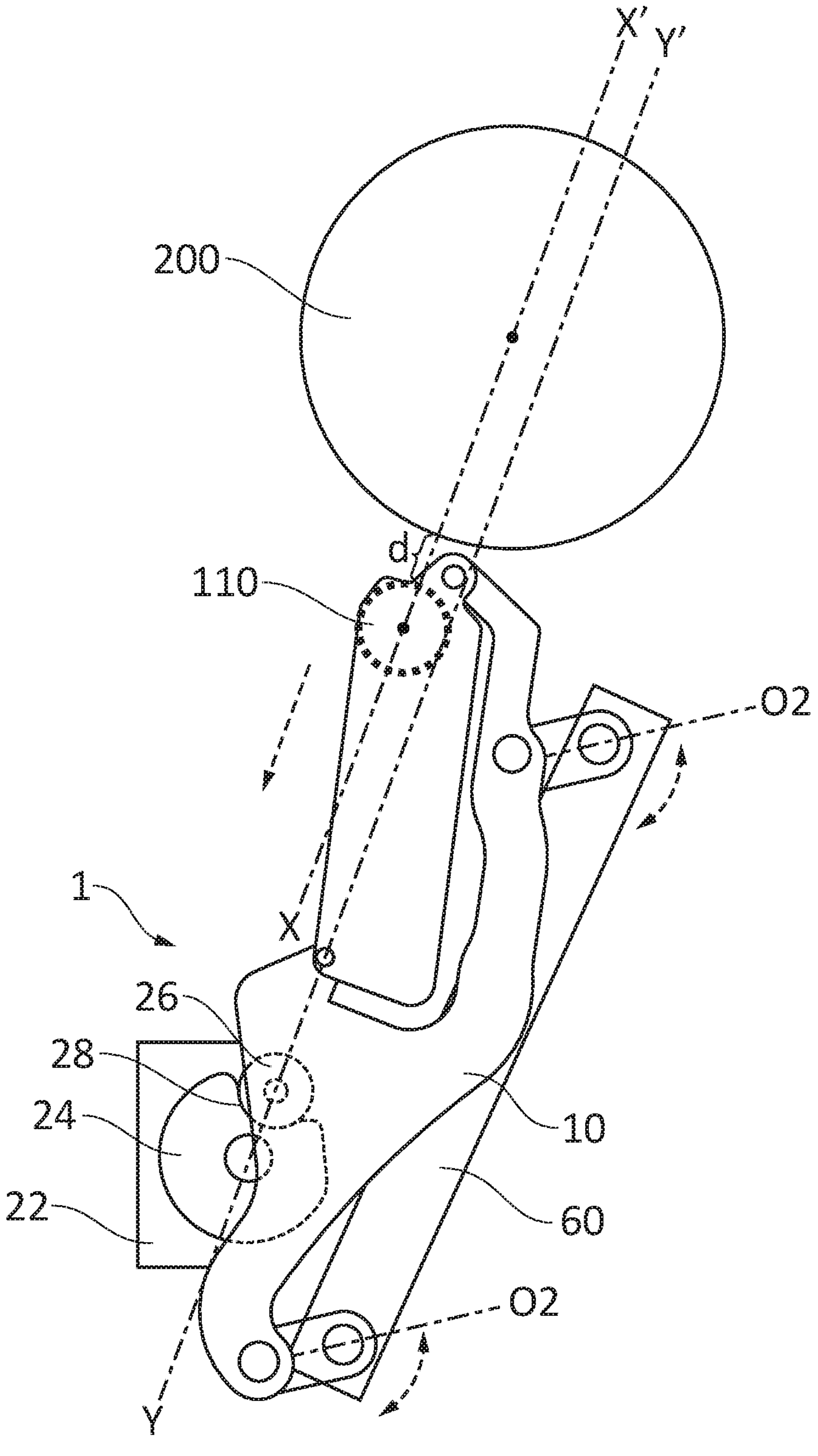
FIG. 12 is a simplified schematic side view of the print agent applicator positioning device of FIG. 10 positioning the print agent applicator in disengagement with the printing drum.

FIGS. 10 to 12 relate to an example of a positioning device 1 where the actuator comprises a drive motor 22, a cam 24 mounted on the drive motor 22 and a follower 26 arranged on the mount 10 in mating contact with the cam 24. As the drive motor 22 rotates the cam 24, the cam 24 applies a driving force on the follower 26 at an actuation point 50 on the mount. The rotation of the drive motor 22 and the profile of the cam 24 determine a profile of engaging and disengaging translational movement of the mount 10 and the supported print agent applicator 100 along the predetermined path relative to a printing drum 200, and to allow for control and accurate positioning of the supported print agent applicator 100 relative to the printing drum 200. In this example, the cam 24 engages the follower 26 so as to apply a force along a direction which is substantially aligned with the predetermined path of translation of the mount 10 and the supported print agent applicator 100. The cam has a slope profile corresponding to the engaging position on the predetermined path whereby the driving force applied by the cam 24 on the follower 26 at the actuation point 50 is substantially aligned with the load force acting on the load point 40. Therefore, when the cam rotates to translate the mount and the supported print agent applicator to the engaging position on the predetermined path, the cam center 80, actuation point 50 and load point 40 are aligned along the axis YY'. This has the effect that the driving force applied on the mount 10 at the actuation point 50 and the opposing engaging force component of the load force at the load point 40 inhibits any turning moment relating to the engaging contact and avoid the need for any additional compensating effect by the guide mechanism to inhibit rotation.

As shown in FIG. 11, the guide mechanism comprises a parallel linkage guide mechanism comprising a first link 32 and a second link 34. The links 32, 34 are equal in length, arranged in parallel and rotatably coupled to the mount 10 and to a support 60. The parallel links 32, 34 are rotatable with respect to the support 60 to permit the mount 10 and the supported print agent applicator 100 to move with translational motion along a predetermined curved path relative to the printing drum 20, while maintaining a constant angular orientation relative to the printing drum. The parallel links 32, 34 are rotatable between a first orientation O1 and a second orientation O2. When the drive motor 22 is activated, the cam 24 is rotated by the drive motor 22 in an anticlockwise direction to apply a driving force on the follower 26. The driving force causes the parallel links 32, 34 to rotate towards the first orientation O1 with respect to the support 60. The rotating parallel links 32, 34 guide the mount 10 and the supported print agent applicator 100 to move with a translational motion upwardly along a predetermined curved path to an engaging position whereby engaging contact 300 forms between the supported print agent applicator 100 and the printing drum 200 as described above. At the engaging position on the predetermined path, the cam center 80, actuation point 50 and load point 40 are aligned along the axis YY' and the force vector acts along the axis YY'. The direction of the force vector along the axis YY', and thereby the direction of translational motion, is in a radial direction towards the printing drum 200. Hence, the print agent applicator 100 is guided in a radial direction into a radial engaging contact with the printing drum 200 whereby the exterior surface 120 of the print agent roller 110 forms a radial mating contact with exterior surface 210 of the printing drum 200, the print agent roller center 130 and the drum center 220 are aligned along axis XX' and the axes YY' and XX" are substantially parallel.

As shown in FIG. 12, when the drive motor is deactivated a gravitational force acts on the mount 10, and the supported print agent applicator 100, causing the parallel links 32, 34 to rotate towards a second orientation O2 whereby the mount 10 and the supported print agent applicator 100 translate downwardly along the predetermined path to disengage the supported print agent applicator 100 from the printing drum. The cam 24 is driven to rotate in a clockwise direction under the action of the follower 26. When the parallel links 32, 34 reach the second orientation O2, the follower becomes seated in a cam recess 28 and comes to rest. The mount 10, and supported print agent applicator 100, are arranged in a disengaging position on the predetermined path whereby the supported print agent applicator 100 is separated from the printing drum by a predetermined radial distanced relative to the radial axis of the printing drum XX'. In other examples, the supported print agent applicator 100 may be disengaged and separated from the printing drum 300 by the predetermined distance d by activating the drive motor 22 to rotate the cam 24 in a clockwise direction to apply a returning force to the follower 26. The returning force causes the parallel links 32, 34 to rotate towards the second orientation O2 and the mount 10 and the supported print agent applicator 100 are translated downwardly along the predetermined path away from the printing drum.

Figure 13:
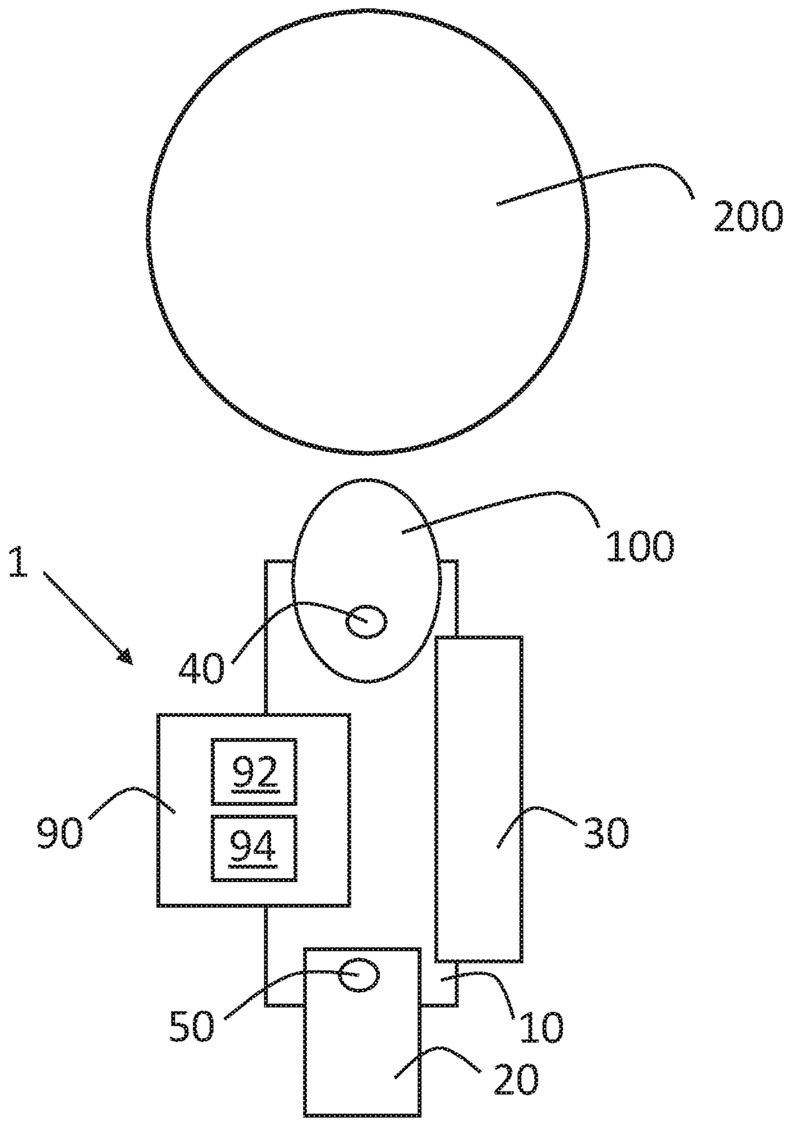
FIG. 13 is a simplified schematic side view of an example print agent application positioning device with a feedback control module.

FIG. 13 shows an example of a positioning device 1 similar to that described in relation to FIGS. 1 and 2 and further comprising a feedback control module 90 to control the positioning device. The feedback control module 90 comprises a sensor 92 to detect a parameter relating to the mount 10 and the supported print agent applicator 100 and a controller 94 to control the actuator 20 to control the mount 10 and the support print agent applicator 100 in response to the detected parameter.

In an example, the feedback control module may comprise a position feedback control comprising a sensor to detect a position parameter relating to the position of the mount and the supported print agent applicator relative to a printing drum, and a controller to monitor the position parameter and to control the actuator to control the position of the mount and the supported print agent applicator relative to the printing drum in response to the detected position parameter.

The feedback control module may comprise a driving force feedback control comprising a sensor to detect a force parameter relating to the driving force of the actuator, and a controller to monitor the force parameter and to control the actuator to control the driving force acting on the mount and the supported print agent applicator relative to the printing drum in response to the detected force parameter.

Figure 14:
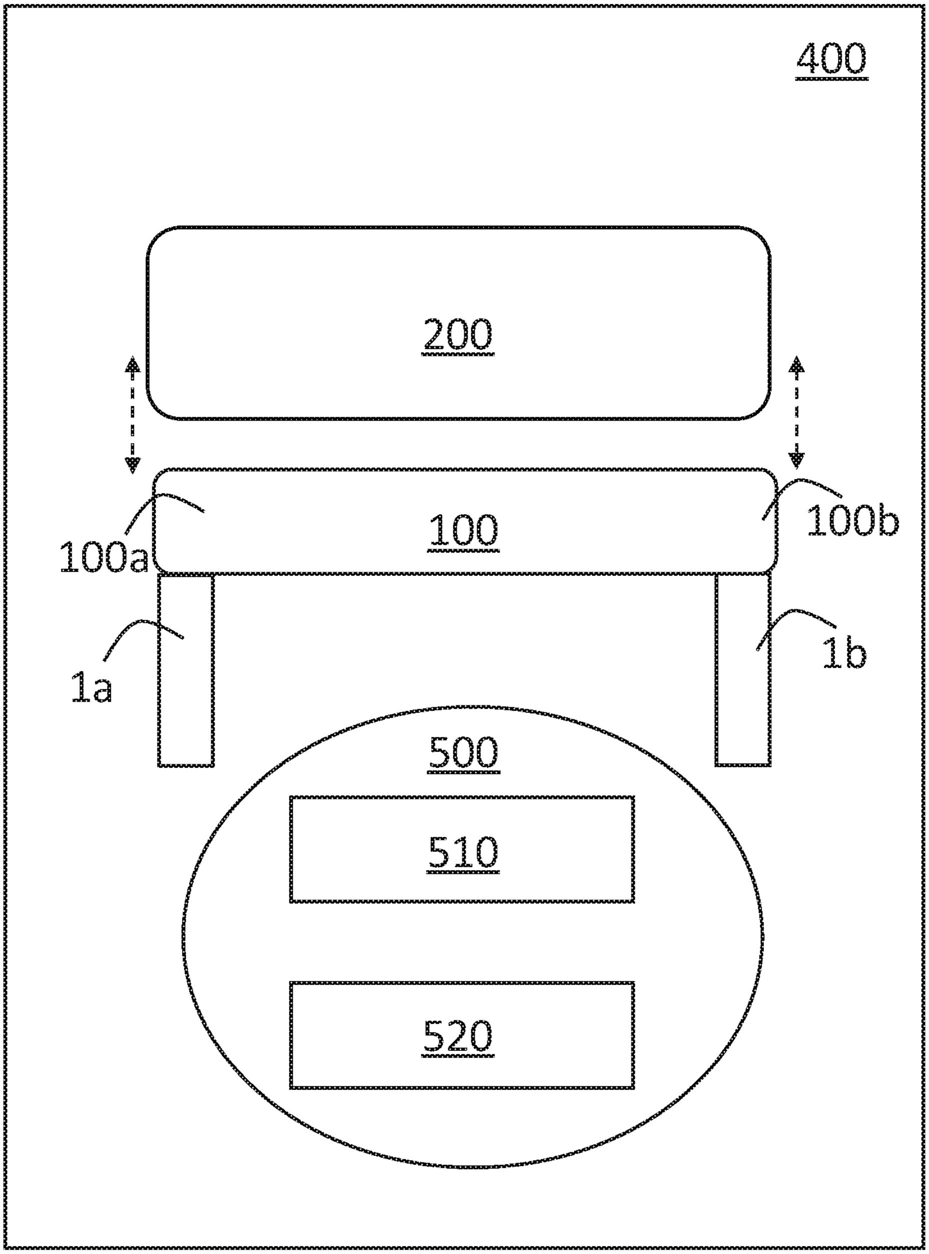
FIG. 14 is a simplified schematic side view of an example positioning system with two positioning devices to position a print agent applicator with respect to a printing drum.

The feedback control module may comprise an engaging force feedback control comprising a sensor to detect a force parameter relating to the engaging force between the supported print agent applicator and the printing drum when the supported print agent applicator and the printing drum are in engaging contact, and a controller to monitor the engaging force parameter and to control the actuator to control the engaging force FIG. 14 depicts a positioning system 400 to position a print agent applicator 100 relative to a printing drum 200. As shown, the positioning system comprises a first positioning device 1*a* to control the position of a first end 100*a* of a print agent applicator and a second positioning device 1*b* to control the position of a second end 100*b* of the print agent applicator 100. The first and second ends of the print agent applicator may be referred to as the front and rear ends of the applicator, and these may be defined according to their proximity to the operator during the changing of the print drum and/or the print agent applicator.

The first and second positioning device may be a positioning device as previously described with reference to FIGS. 1 to 12.

The system may comprise a feedback control module 500 to control the positioning devices. The feedback control module may comprise a sensor 510 to detect a position parameter relating to the position of the mount and the supported print agent applicator relative to a printing drum, and a controller 520 to monitor the position parameter and to control the respective actuators of the devices to control the position of the mount and the supported print agent applicator relative to the printing drum in response to the detected position parameter.

The sensor may be a sensor to detect a rotation or rotational orientation of the motor or the cam, whereby the rotation or rotational orientation of the motor or the cam relates to the position of the mount and the supported applicator.

The feedback control module may comprise a sensor to detect a force parameter relating to the driving force of the actuator, and a controller to monitor the force parameter and to control the respective actuators of the positioning devices to control the driving force acting on the mount and the supported print agent applicator relative to the printing drum in response to the detected force parameter.

The feedback control module may comprise a sensor to detect a force parameter relating to the engaging force between the supported print agent applicator and the printing drum when the supported print agent applicator and the printing drum are in engaging contact, and a controller to monitor the engaging force parameter and to control the respective actuators of the positioning devices to control the engaging force. The sensor and the controller may be separate from or the same as that described above for monitoring a force parameter relating to the driving force of the actuator.

The sensor may be a torque sensor to detect a torque acting on the motor of the respective actuators, whereby the torque is due to an engaging force between the applicator and printing drum in reaction to the driving force, and it is indicative that the applicator is positioned in engaging contact with the printing drum.

The sensor may be a load cell to detect a force parameter independent to the motor. The load cell is an element that when force (compression or tension) is applied on it, it generates electric parameter. In an example, when placing a load cell between the supported print agent applicator and the printing drum it will experience a compression load which is directly correlated to the engaging force and generate an electric parameter indicative of the engaging force.

The feedback control module may control the respective actuators of the positioning devices collectively or independently. The controller may control the respective actuators of the positioning devices so that the respective print agent applicators simultaneously or sequentially engage with the printing drum and/or simultaneously or sequentially disengage from the printing drum.

The feedback control module may control the actuators of the positioning devices to control the position of the first and second ends of the supported print agent applicator so as to target a uniform engaging contact along the length of the supported print agent applicator. The feedback control module may control the actuators of the positioning devices to control the position of the first and second ends of the supported print agent applicator so as to target a uniform disengagement along the length of the supported print agent applicator. The feedback control module may control the actuators to control the position of the first and second ends of the print agent applicator to correct for any differences/misalignments in the printing apparatus, for example based on the position parameter or a force parameter as described above.

The feedback control module may control the actuators of the respective positioning devices to control the driving force of the actuators to target a predetermined engaging force (for example, an engaging force within a predetermined range) or force profile between the supported print agent applicator and the printing drum. The predetermined engaging force profile may correspond to a uniform engaging force along the length of the supported print agent applicator, and it may be targeted based on targeting equivalence in the force parameters associated with each of the positioning devices. The predetermined engaging force may be of a magnitude to achieve a sufficient pressure for a smooth transfer of print agent from the print agent applicator and the printing drum.

Due to the direct driving arrangement of the actuator on the mount, intermediate components are avoided and mechanical noise from intermediate components is averted. Hence, the signal to noise ratio and monitoring to determine the driving force of the motor and/or position of the supported print agent applicator may be improved.

The positioning devices described herein provide for minimised actuation and interface tolerances between the actuator, mount and guide mechanism to enable improved sensing and control of the actuator (motor and/or cam), and thereby improved positioning of the supported print agent applicator relative to the printing drum and/or engaging force applied by the applicator on the printing drum.

Figure 15:
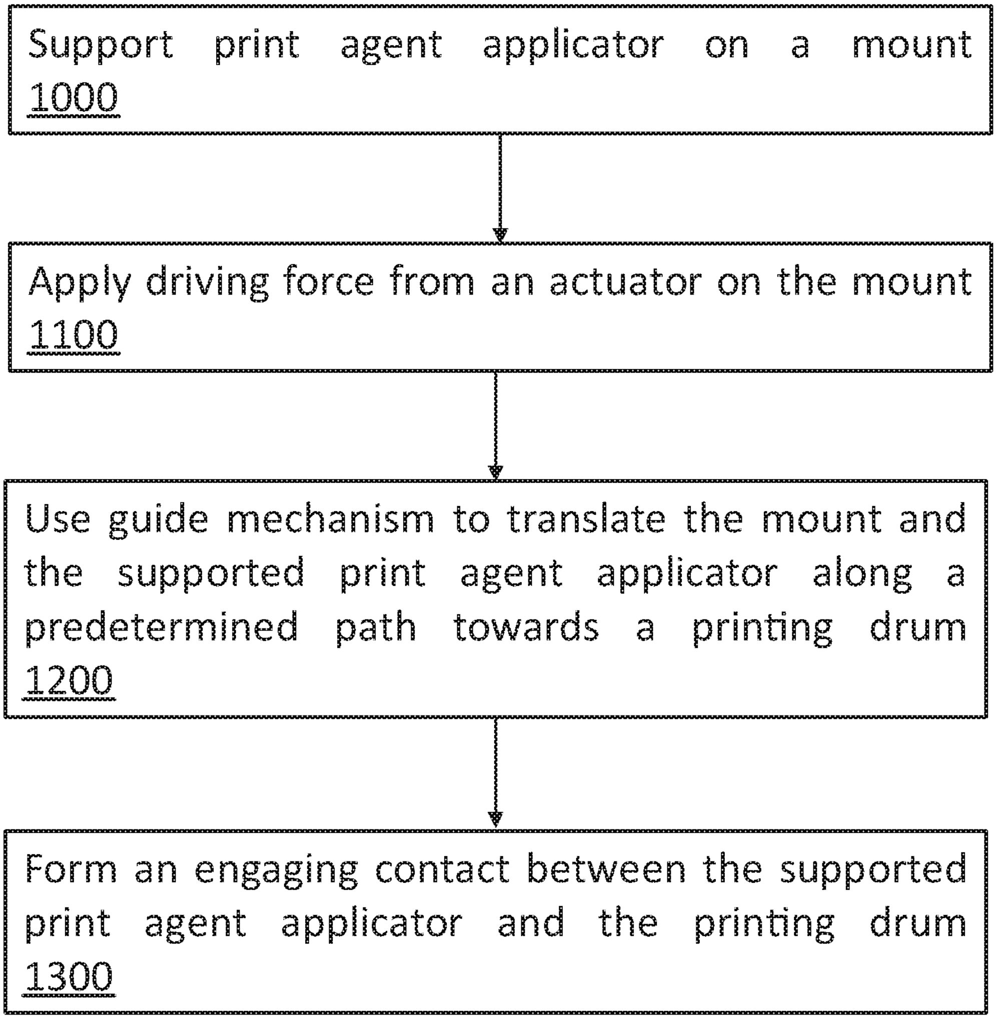
FIG. 15 is a flowchart of an example method of positioning a print agent applicator with respect to a printing drum.

An example method of positioning a print agent applicator with respect to a printing drum is shown in FIG. 15. The method may be applied to any of the positioning devices described above with respect to FIGS. 1-14. In block 1000, a print agent applicator is supported at a load point on a mount. In block 1100, a driving force is applied by an actuator at an actuation point on the mount. In block 1200, the mount and supported print agent applicator are guided under the driving force, by a guide mechanism, to translate along a predetermined path towards a printing drum. In block 1300, an engaging contact is formed between the supported print agent applicator and the printing drum to allow for print agent to be transferred from the supported print agent applicator to the printing drum.

Figure 16:
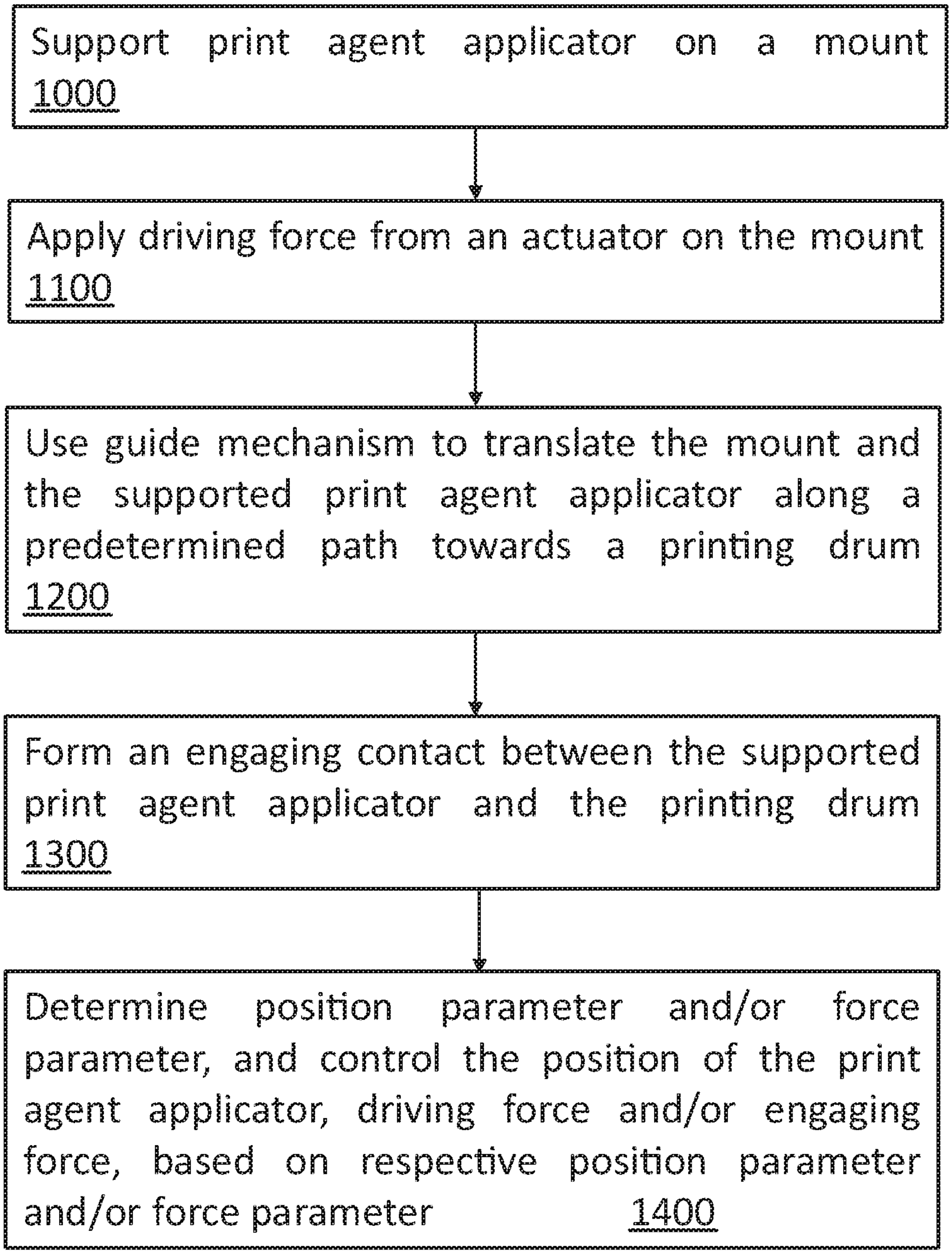
FIG. 16 is a flowchart of a further example method of positioning a print agent applicator with respect to a printing drum.

FIG. 16 shows a further example method which includes blocks 1000 to 1300 as described above. In addition, in block 1400, a position parameter and/or a force parameter is determined whereby the position parameter is indicative of the position of the supported print agent applicator, and the force parameter is indicative of the driving force acting on the supported print agent applicator or the engaging force applied by the supported print agent applicator on the printing drum when the supported print agent applicator and printing drum are in engaging contact. Then, based on the respective determined position parameter and/or force parameter, the actuator is controlled to control the position of the supported print agent applicator relative to the printing drum, to control the driving force and/or to control the engaging force.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An apparatus comprising a print agent applicator positioning device, the device comprising:

a mount to support a print agent applicator at a load point on the mount;

an actuator coupled to the mount to apply a driving force at an actuation point on the mount; and a guide mechanism to guide the mount and supported print agent applicator, under the driving force, to translate along a predetermined path towards a printing drum to form an engaging contact between the print agent applicator and the printing drum, wherein the printing drum is a photoconductive printing drum, wherein the predetermined path is curved, and wherein there is no change in the orientation of the mount and supported print agent applicator relative to the printing drum during the translation along the curved predetermined path.

2. The apparatus as claimed in claim 1, wherein the apparatus further comprises a printing drum; and wherein the guide mechanism is to guide the mount and supported print agent applicator, under the driving force, to translate along the predetermined path in a radial direction towards the printing drum to form a radial engaging contact between the print agent applicator and the printing drum.

3. The apparatus as claimed in claim 1, wherein the guide mechanism is to guide the mount and supported print agent applicator, under a gravitational force, to translate along the predetermined path away from the printing drum to separate the print agent applicator and the printing drum by a predetermined distance.

4. The apparatus as claimed in claim 1, wherein the actuator is to apply a returning force at the actuation point on the mount; and wherein the guide mechanism is to guide the mount and supported print agent applicator, under the returning force, to translate along the predetermined path away from the printing drum to separate the print agent applicator and the printing drum by a predetermined distance.

5. The apparatus as claimed in claim 1, wherein the device comprises a support; and wherein the guide mechanism comprises a parallel linkage mechanism comprising parallel links coupled to the mount and the support, wherein the parallel links are of equal length and the rotation of the parallel links defines the predetermined path and permits the translation of the mount and the supported print agent applicator along the predetermined path.

6. The apparatus as claimed in claim 1, wherein the guide mechanism comprises a linear actuator.

7. The apparatus as claimed in claim 6, wherein the device comprises a support; and wherein the linear actuator comprises a track coupled to the support and adjacent to the mount, and a rider extending from the mount and slidably coupled to the track, whereby the track defines the predetermined path and the sliding of the rider along the track permits the translation of the mount and the supported print agent applicator along the predetermined path.

8. The apparatus as claimed in claim 1, wherein the actuator comprises a drive motor, a cam driven to rotate by the motor, and a follower arranged at the actuation point on the mount.

9. The apparatus as claimed in claim 8, wherein a center of the cam, the actuation point and the load point are aligned on a common axis when the print agent applicator is in engaging contact with the printing drum.

10. The apparatus as claimed in claim 1, wherein the device comprises a stabilizing connector to support the print agent applicator at a stabilizing point on the mount, separate from the load point.

11. The apparatus as claimed in claim 1, wherein the device further comprises:

a first feedback control module comprising:

a sensor to determine a position parameter indicative of the position of the supported print agent applicator;

a controller to monitor the position parameter and to control the actuator of the positioning device to control the position of the mount and the supported print agent applicator relative to the printing drum in response to the position parameter;

and/or a second feedback control module comprising:

a second sensor to determine a force parameter indicative of the driving force or an engaging force applied by the supported print agent applicator on the printing drum when the supported print agent applicator and printing drum are in engaging contact; and a second controller to monitor the force parameter and to control the actuator to control the driving force and/or the engaging force in response to the force parameter.

12. A positioning system for a print agent applicator comprising:

two positioning devices to support a common print agent applicator, wherein each positioning device comprises:

a mount to support the common print agent applicator;

an actuator coupled to the mount to apply a driving force at an actuation point on the mount;

a guide mechanism to guide the mount and the supported print agent applicator, under the driving force, to translate along a predetermined path towards a printing drum to form an engaging contact between the supported print agent applicator and the printing drum;

a first feedback control module comprising:

a sensor to determine a position parameter indicative of the position of the supported print agent applicator;

a controller to monitor the position parameter and to control the respective actuators of the positioning devices to control the position of the mount and the supported print agent applicator relative to the printing drum in response to the position parameter; and a second feedback control module comprising:

a second sensor to determine a force parameter indicative of the driving force or an engaging force applied by the supported print agent applicator on the printing drum when the supported print agent applicator and printing drum are in engaging contact; and a second controller to monitor the force parameter and to control the respective actuators of the positioning devices to control the driving force and/or the engaging force in response to the force parameter.

13. A method comprising:

supporting a print agent applicator at a load point on a mount;

applying a driving force from an actuator at an actuation point on the mount;

guiding the mount and supported print agent applicator under the driving force, by a guide mechanism, to translate along a predetermined path towards a printing drum;

forming an engaging contact between the supported print agent applicator and the printing drum for print agent to be transferred from the supported print agent applicator to the printing drum;

determining, via a sensor, a position parameter indicative of the position of the supported print agent applicator;

monitoring, via a controller, the position parameter and controlling respective actuators of positioning devices to control the position of the mount and the supported print agent applicator relative to the printing drum in response to the position parameter;

determining, via a second sensor, a force parameter indicative of the driving force or an engaging force applied by the supported print agent applicator on the printing drum when the supported print agent applicator and printing drum are in engaging contact; and monitoring, via a second controller, the force parameter and controlling the respective actuators of the positioning devices to control the driving force and/or the engaging force in response to the force parameter.

* * * * *